United States Patent [19]
Hori et al.

[11] Patent Number: 5,301,264
[45] Date of Patent: Apr. 5, 1994

[54] FIGURE ENCODER

[75] Inventors: Osamu Hori; Akio Okazaki, both of Yokohama, Japan

[73] Assignee: Kabushiki Kaisha Toshiba, Kawasaki, Japan

[21] Appl. No.: 913,985

[22] Filed: Jul. 16, 1992

Related U.S. Application Data

[63] Continuation of Ser. No. 269,124, Nov. 9, 1988, abandoned.

[30] Foreign Application Priority Data

Nov. 12, 1987 [JP] Japan .......................... 62-285902

[51] Int. Cl.$^5$ ............................ G06F 15/40
[52] U.S. Cl. ............................ 395/128; 382/22
[58] Field of Search ............... 395/128, 129, 142, 155, 395/161; 382/22, 48, 56, 23; 340/703, 477, 750

[56] References Cited

U.S. PATENT DOCUMENTS

| | | | |
|---|---|---|---|
| 4,020,463 | 4/1977 | Himmel | 364/518 |
| 4,528,692 | 7/1985 | Umeda et al. | 382/9 |
| 4,566,126 | 1/1986 | Miyagawa et al. | 382/48 |
| 4,566,128 | 1/1986 | Araki | 382/56 |
| 4,630,309 | 12/1986 | Karow | 382/56 |
| 4,672,683 | 6/1987 | Matsueda | 382/57 |
| 4,727,589 | 2/1988 | Hirose et al. | 382/56 |
| 4,783,829 | 11/1988 | Miyakawa et al. | 382/22 |
| 4,783,841 | 11/1988 | Crayson | 382/56 |
| 4,809,201 | 2/1989 | Keklak | 364/518 |
| 4,817,187 | 3/1989 | Lien | 382/56 |
| 4,858,150 | 8/1989 | Aizawa et al. | 364/522 |

OTHER PUBLICATIONS

Arcelli, "Pattern Thinning by Contour Tracing," Computer Graphics and Image Processing, 17, 1981, pp. 130-144.

Okazaki et al., "An Automatic Circuit Diagram Reader with Loop-Structure-Based Symbol Recognition," IEEE Transactions on Pattern Analysis and Machine Intelligence, vol. 10, No. 3, May 1988, pp. 331-341.

*Primary Examiner*—Phu K. Nguyen
*Attorney, Agent, or Firm*—Foley & Lardner

[57] ABSTRACT

A figure encoder is disclosed which is particularly suitable for closed figures and which requires considerably reduced amount of information to be supplied by an operator and which is capable of registering the correct figures even when the original images contains some errors. The figure encoder may includes an image memory, a display, a device for specifying points on a displayed images, a device for extracting figures in accordance with the specified points, and a device for symbolizing the extracted figures. The figure encoder may include an image memory, a display, a device for specifying points on a displayed images, a device for thinning displayed images, a device for interpolating end points in the thinned figure, and a device for symbolizing the thinned figure.

4 Claims, 8 Drawing Sheets

| LINE SEGMENT | A x | y | B x | y |
|---|---|---|---|---|
| a | $x_{11}$ | $y_{11}$ | $x_{21}$ | $y_{21}$ |
| b | $x_{12}$ | $y_{12}$ | $x_{22}$ | $y_{22}$ |
| ⋮ |  |  |  |  |
| n |  |  |  |  |

FIGURE ENCODER

This application is a continuation of application Ser. No. 07/269,124, filed Nov. 9, 1988, now abandoned.

BACKGROUND OF THE INVENTION

1. Field of the Invention

The present invention relates to a figure encoder for encoding figures primarily comprised of lines, such as drawings or maps, so as to facilitate registration of such figures to computers and, more particularly, to such a figure encoder especially suitable for closed figures.

2. Description of the Prior Art

Recently, much effort has been made to develop computerized administration systems for figures primarily comprised of lines, such as logical circuit diagrams, architectural drafts, or maps, by encoding such figures to store them in a data-base, and utilizing the recorded information for CAD, CAM, or other computerized operations.

One conventional method for executing the registration of the figures is to record the figures in an image memory by means of an imaging device and to extract figure data automatically by methods of pattern recognition. In this method, a sufficiently high standard of accuracy in the pattern recognition has not yet been achieved, so that corrections of recognition errors which requires enormously cumbersome procedures are indispensable. Moreover, the types of images that can be handled by this method are still extremely limited.

Registration of those images whose complexity prohibit application of the method just described have conventionally been accomplished by manual operations of specifying each point on the figures, representing the figures by the sets of coordinates of the specified points, and registering these sets of coordinates as figure data to computers by means of a digitizer. A variation of this method in which images are scanned by a scanner, stored in an image memory and displayed on a display on which coordinate points are specified by means of a pointing device is also conceivable. Both of these methods require a large number of points to be specified manually, which poses serious problems concerning the time required and the accuracy of the procedure.

SUMMARY OF THE INVENTION

It is therefore an object of the present invention to provide a figure encoder capable of registering closed figures accurately, and which can be operated by simple operations.

According to one aspect of the present invention, there is provided a figure encoder, comprising: an image memory means for recording images; display means for displaying the images recorded in the image memory means; pointing means for specifying a point on the images displayed on the display means; means for extracting an image of a closed figure enclosing the specified point in accordance with a coordinate of the specified point; and means for symbolizing the extracted image of the closed figure.

According to another aspect of the present invention there is provided a figure encoder, comprising: an image memory means for recording images; display means for displaying the images recorded in the image memory means; pointing means for providing a way to specify a point on the images displayed on the display means; means for detecting coordinates of end points of line segments which are indicated to be forming a single closed figure by the pointing means; means for joining the detected end points on the images recorded in the image memory means to produce the single closed figure; and means for symbolizing the extracted image of the closed figure.

Other features and advantages of the present invention will become apparent from the following description taken in conjunction with the accompanying drawings.

BRIEF DESCRIPTION OF THE DRAWINGS

FIG. 6 (a) and (b) are illustrations of examples of figures to be extracted for explaining the figure extracting step shown in FIG. 5.

FIG. 7 (a) and (b) are illustrations of portions of the figures to be extracted for explaining the figure extracting step shown in FIG. 5.

DETAILED DESCRIPTION OF THE PREFERRED EMBODIMENTS

Figure 1:
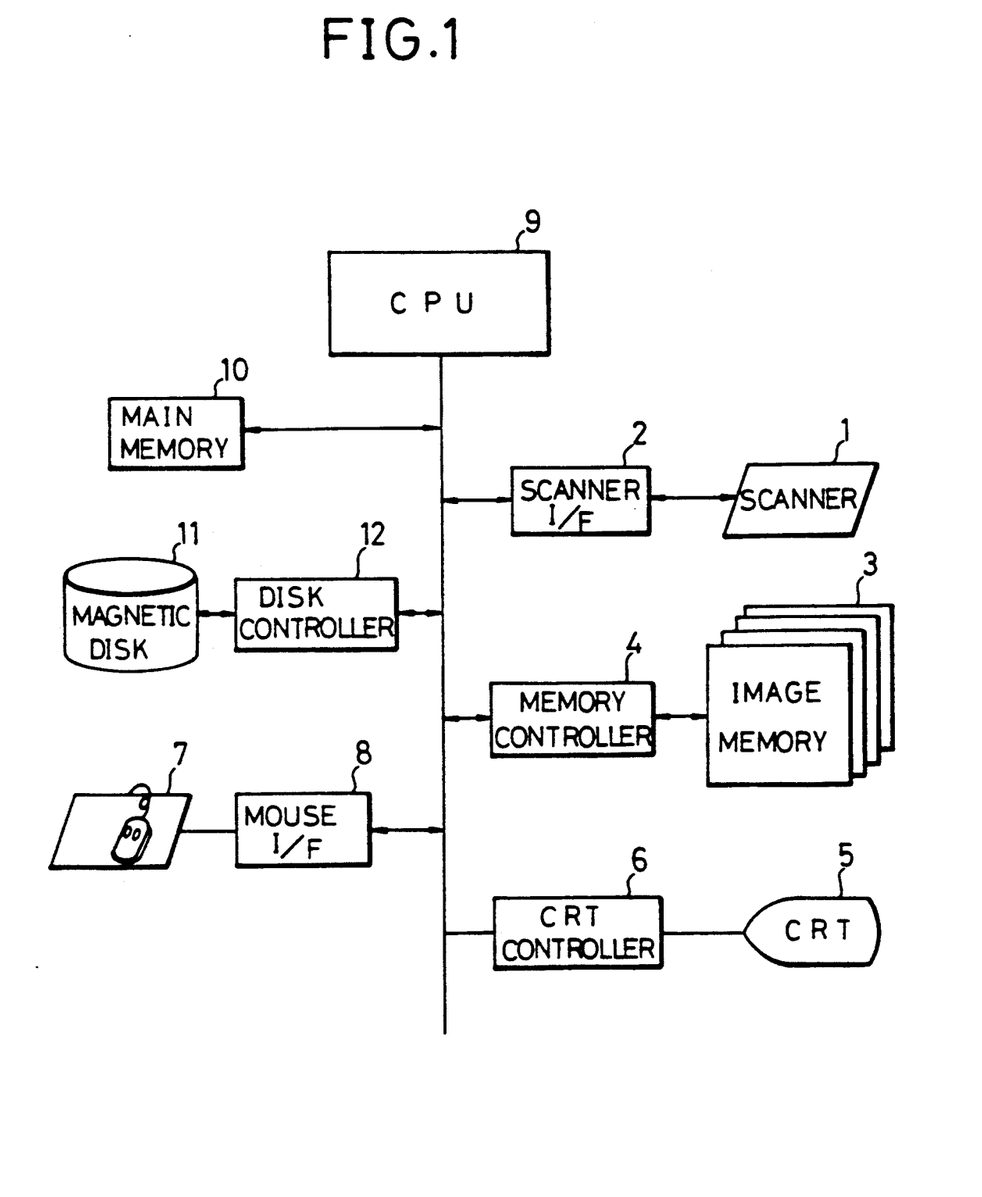
FIG. 1 is a block diagram of one embodiment of a figure encoder according to the present invention.

Referring now to FIG. 1, there is shown one embodiment of a figure encoder according to the present invention.

Figure 2:
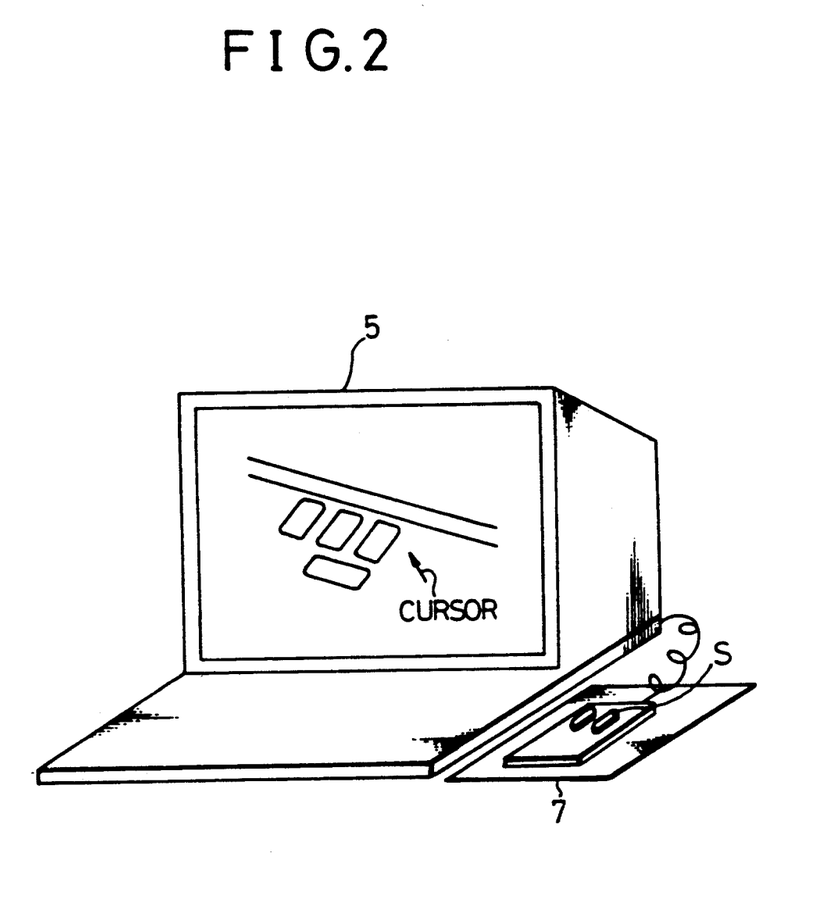
FIG. 2 is an illustration of the figure encoder shown in FIG. 1.

This figure encoder comprises a scanner 1 including an imaging device for scanning images of figures such as logical diagrams or architectural drafts, and producing binary image data in which lines are represented by '1' while backgrounds are represented by '0', a scanner interface 3, an image memory 2 for storing image data produced by the scanner 1, a memory controller 4, a CRT display 5, a CRT controller 6, a mouse as a pointing device 7 which provides ways to control the position of a cursor, such as one shown in FIG. 2, on the CRT display 5 and specify a coordinate of the position of the cursor at a desired location when a button S is pressed, a mouse interface 8, CPU 9 for carrying out an encoding process to be explained below, a main memory 10, a magnetic disk 11, and a disk controller 12.

Figure 3:
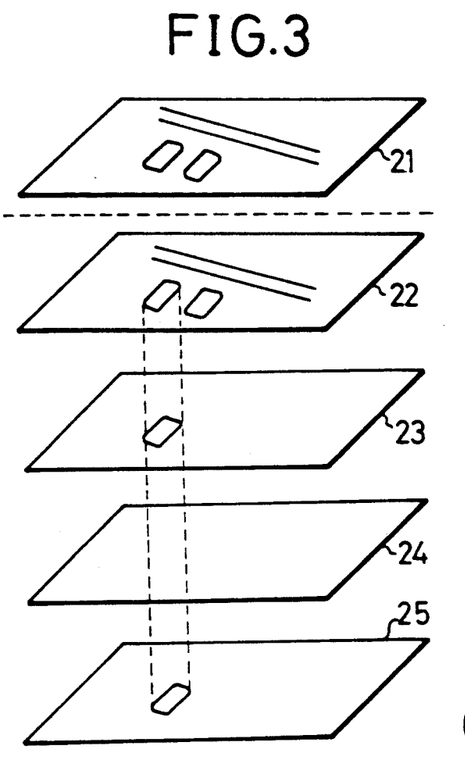
FIG. 3 is an illustration for explaining the configuration of an image memory in the figure encoder shown in FIG. 1.

FIG. 3 shows a configuration of the image memory 3 which comprises a memory 21 for an original image scanned by the scanner 1 to be displayed on the CRT display 5, a memory 22 for thinned images, third and fourth memories 23 and 24 to be used in a process of extracting image data of closed figures, and a memory 25 for extracted image data of closed figures. The image memory 3 is connected through the memory controller 4 with the CPU 9 so that information can be exchanged freely. Thus, it is possible to read out the image data stored in the memory 21, and perform various image processings at the CPU 9, and then store the results in an another memory. In a course of image processing, the main memory 10 and the memories 23 and 24 of the image memory 3 may be utilized as temporary storing spaces. Also, for storing the final results the main memory 10, the memories 23 and 24 of the image memory 3, and the magnetic disk 11 may be used.

The operation of this figure encoder will now be explained with references to FIGS. 4 to 10.

Figure 4:
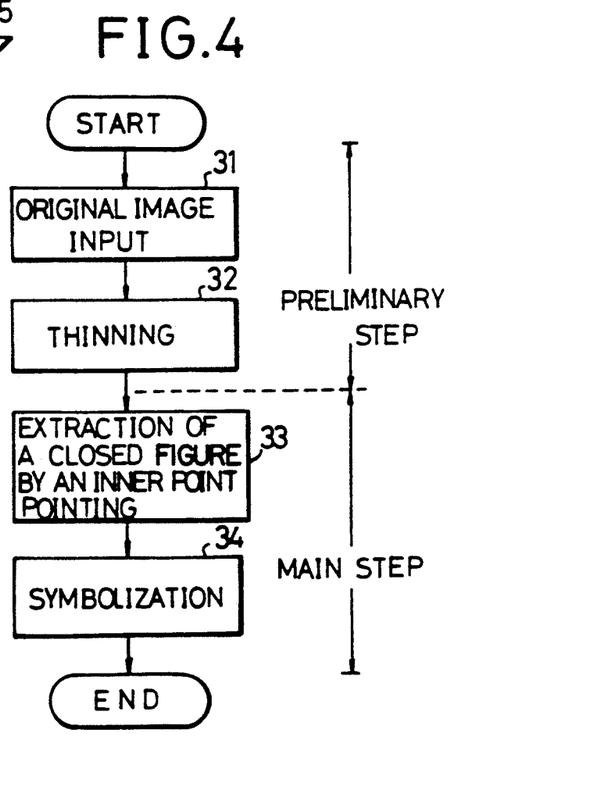
FIG. 4 is a main flow chart for the figure encoder shown in FIG. 1.

FIG. 4 shows a schematic flow chart for the operation of this figure encoder. The operation is divided into a preliminary step and a main step. The preliminary step consists of the step 31 in which the original images are scanned by the scanner 1 and the image data are stored in the memory 21 of the image memory 3, and the step 32 in which a thinning of images are performed and the thinned images are stored in the memory 22 of the image memory 3. The main step consists of the step 33 in which the image data of closed figures are extracted from the thinned images, and the step 34 in which the extracted image data of the closed figures are symbolized. This symbolization can, for example, be a vectorization or other known methods.

Figure 5:
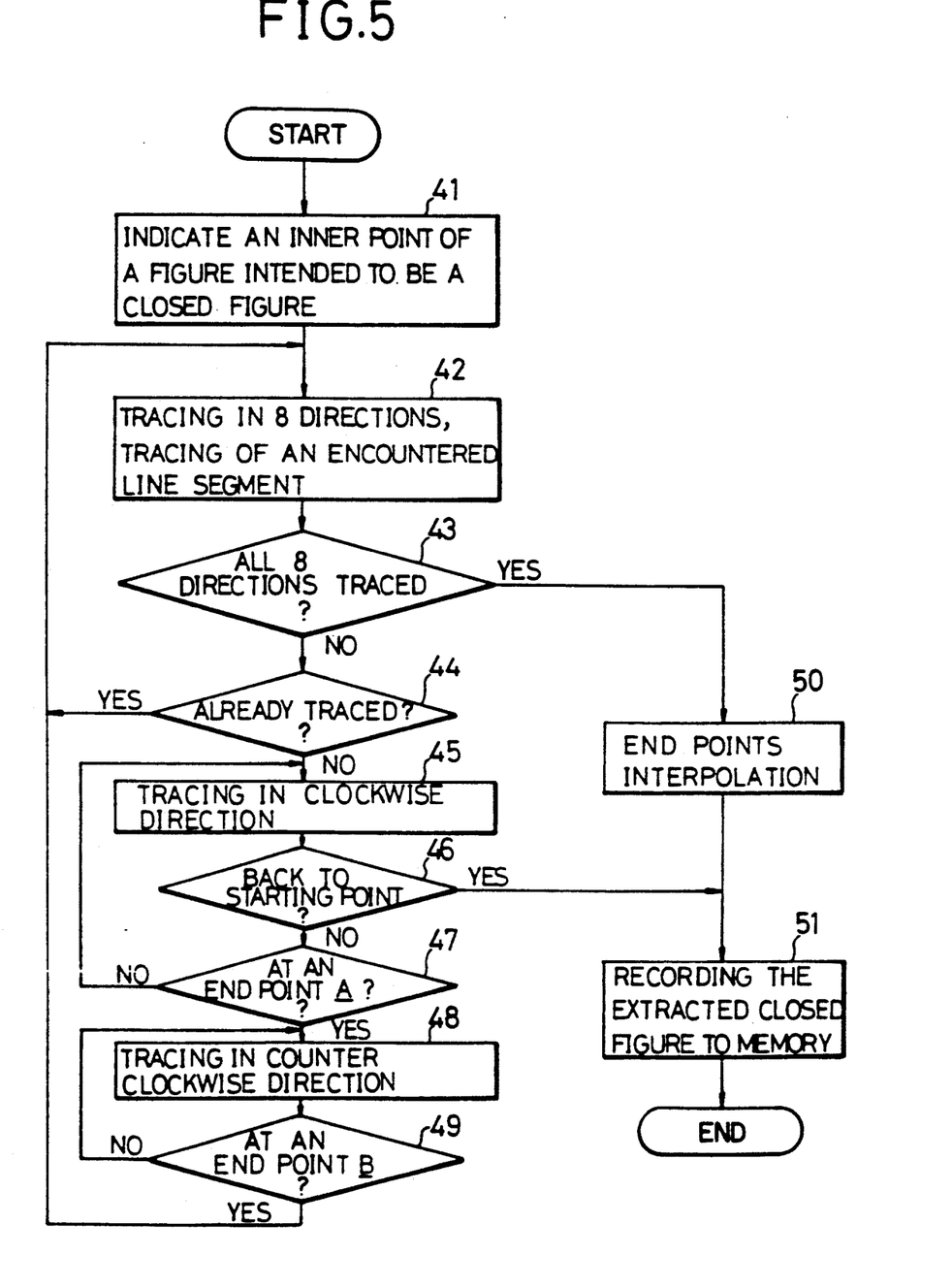
FIG. 5 is a detailed flow chart for a figure extracting step of the flow chart shown in FIG. 4.
Figure 6A:
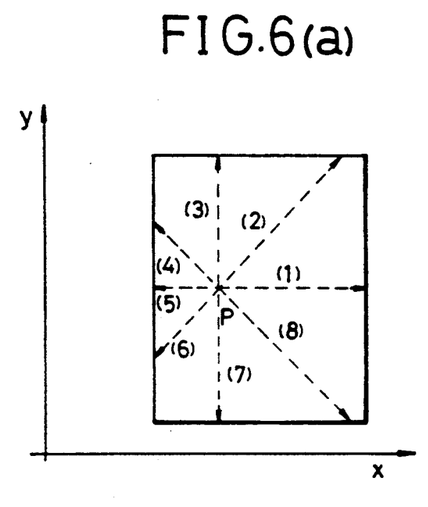
Figure 6B:
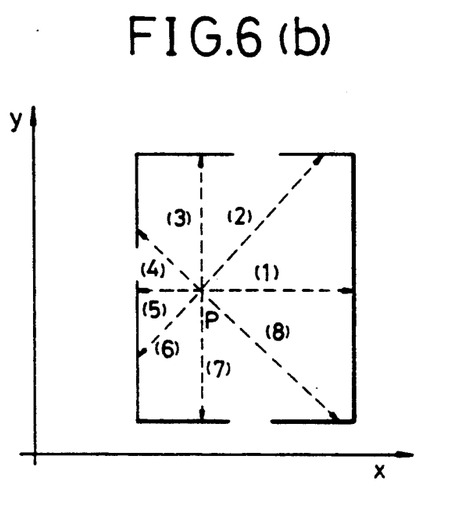
Figure 7A:
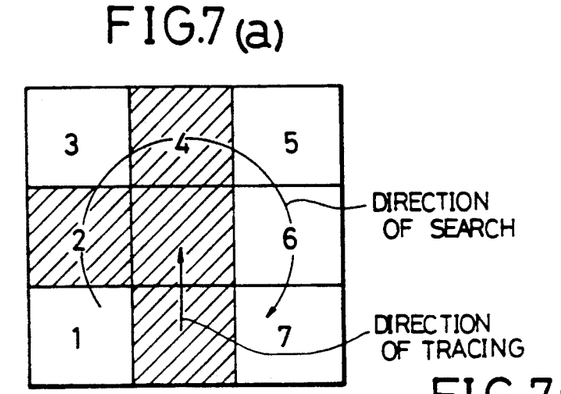
Figure 7B:
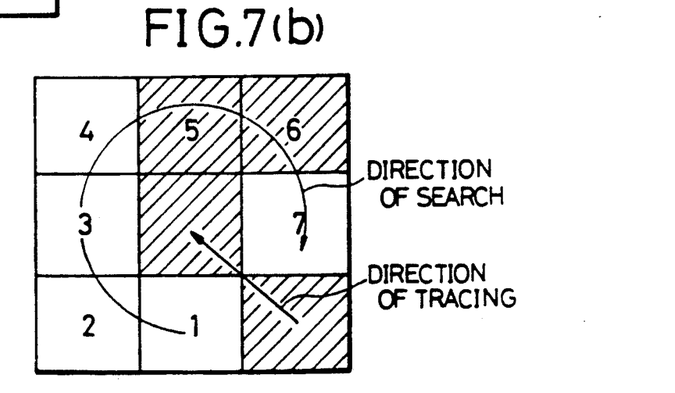

FIG. 5 shows a detailed flow chart of the step 33. At the step 41, a point P inside a figure intended to be a closed figure is specified by an operator by means of the pointing device 7 and the coordinate of the specified point is obtained. Then at the step 42, tracing in eight directions from the point P is performed and when line segments are encountered the line segments are traced as shown in FIG. 6. Namely, the tracing in a direction (1) is performed first, and when a line segment is encountered that line segment is traced. Here the tracing is carried out for 4-connected figures if the thinning at the step 32 is 4-connected, or it is carried out for 8-connected figures if the thinning at the step 32 is 8-connected. The tracing of a line segment is performed by writing '1' to the address in the memory 23 of the image memory 3 corresponding to the coordinates of points on the line segment. The tracing at each point proceeds by searching a point on the line segment in the clockwise direction with respect to the direction of the tracing (step 45), which is graphically shown in FIG. 7.

When the line segment forms a completely closed loop as shown in FIG. 6 (a), the tracing in that direction terminates as the tracing returns to where the tracing of the line segment had started (step 46), and the result is stored in the memory 25 of the image memory 3 (step 51).

On the other hand, when the line segment is not closed in spite of the original intention to be a closed loop, such as one shown in FIG. 6 (b), the tracing of the line segment reaches an end point instead of returning to the starting point. When this is the case, tracing in the counterclockwise direction is carried out (step 48) and the coordinates of an end point A found in the tracing in the clockwise direction (step 46) and an end point B found in the tracing in the counterclockwise direction (step 49) are recorded in an end points table prepared in the main memory 10 such as one shown in FIG. 8.

After the tracing in the direction (1) is terminated, the tracing in the direction (2) from the point P is carried out in the similar manner which, however, also terminates when the line segment already traced is encountered (step 44). Similarly, the tracings in the directions (3) to (8) are carried out sequentially until the tracing in all of the eight directions is completed (step 43). As a result of these tracings, figure data of the line segments in the memory 23 of the image memory 3 and the end points table in the main memory 10 are obtained.

Figure 8:
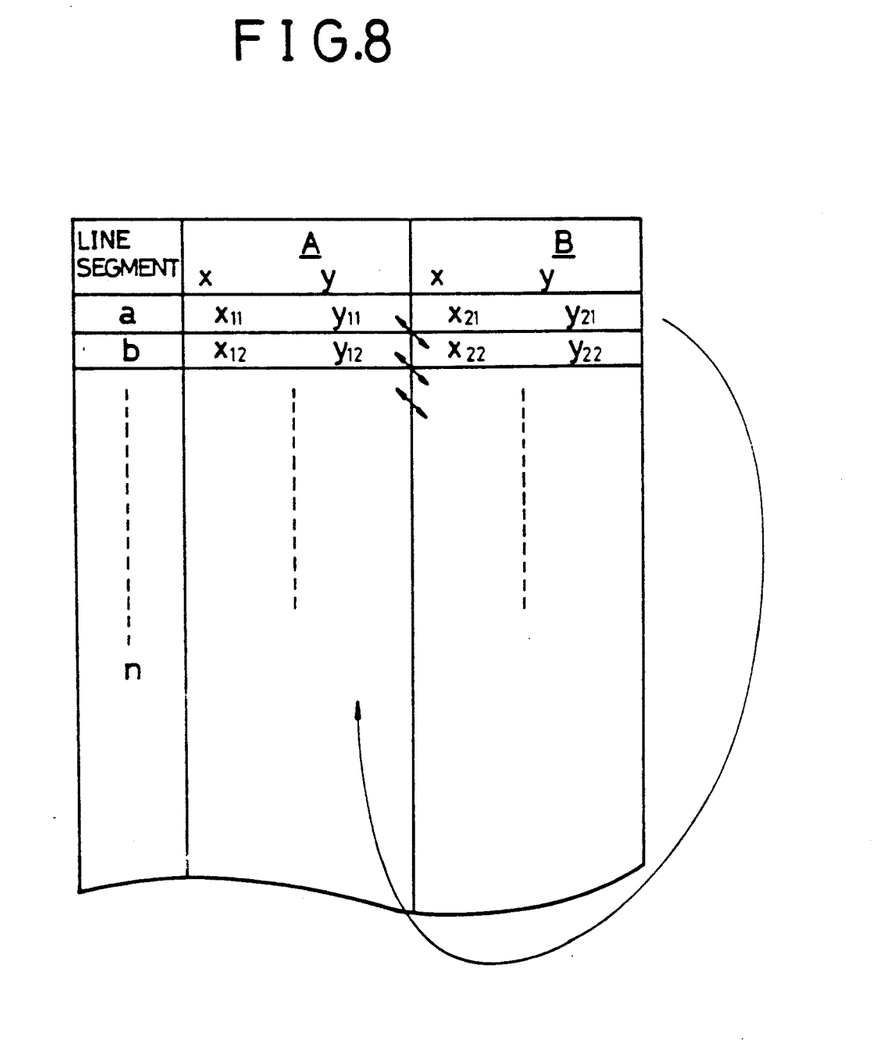
FIG. 8 is an illustration of an end point table to be utilized in the figure extracting step shown in FIG. 5.

Next, at the step 50 the end points originally intended to be connected are interpolated. Namely, as indicated in FIG. 8 by arrows, the end point A of the line segment a is joined with the end point B of the next line segment b, the end point A of the line segment b is joined with the end point B of the next line segment c, and so on. Here the interpolating pieces are 4-connected lines when the thinning is 4-connected, or they are 8-connected lines when the thinning is 8-connected, and they are also recorded in the memory 23 of the image memory 3. Then the resultant closed loop is stored in the memory 25 of the image memory 3 at the step 51. If necessary, this closed loop may be transformed into chain codes to be stored in the main memory 10.

Next, the process takes place to form a single closed loop when what was originally intended as a single closed loop is divided up into a number of closed loops since portions overlap.

Figure 9:
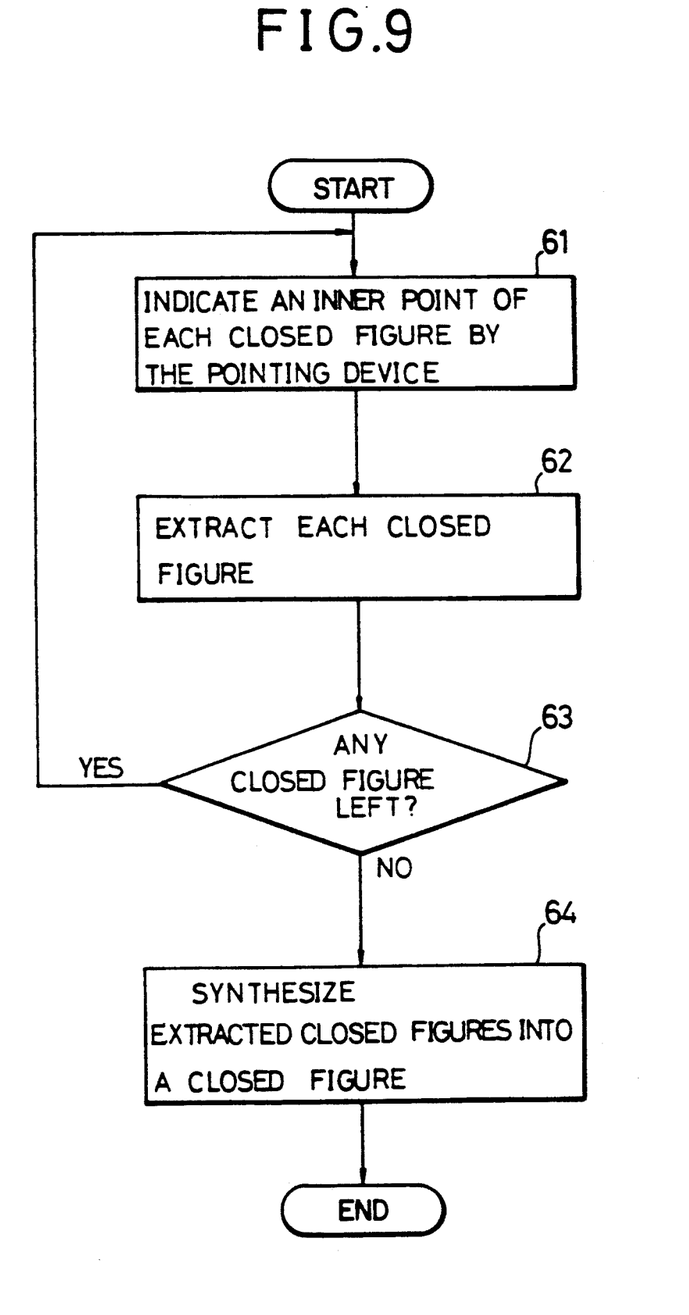
FIG. 9 is a detailed flow chart for synthetic figure extraction of the figure encoder shown in FIG. 1.

FIG. 9 shows a flow chart for this process. At the step 61 a point inside one of the closed loops is specified by the operator by means of the pointing device 7, and then at the step 62 the extraction of the loop is carried out as before. The similar process for the other loops are carried out, one at a time (step 63). The coordinates of the specified points are stored in the main memory 10. Then at the step 64, the extracted loops are synthesized into a single closed figure.

Figure 10:
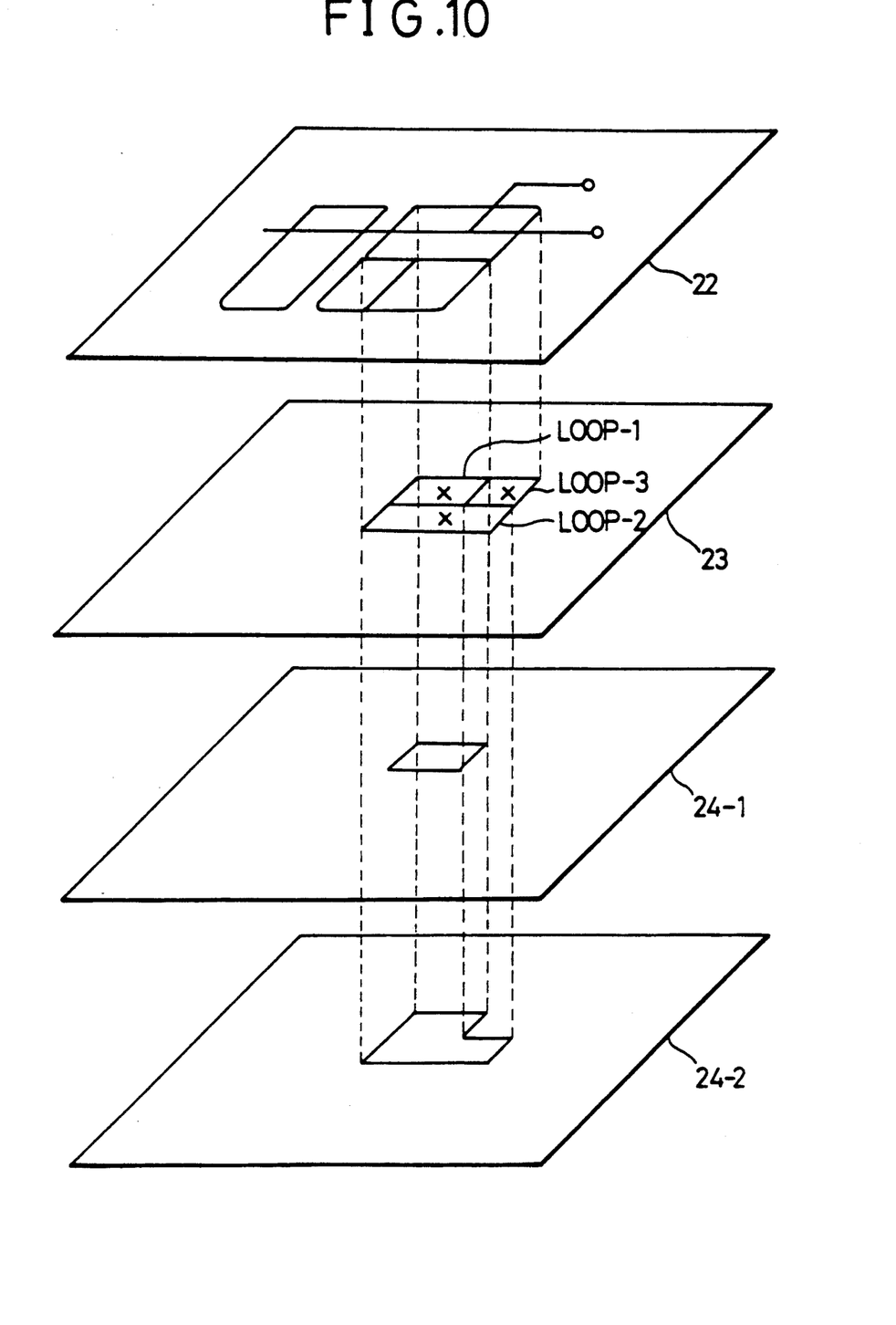
FIG. 10 is an illustration of an example of combined figure for explaining the synthetic figure extraction shown in FIG. 9.

An example of this process is illustrated in FIG. 10 in which there is a closed loop divided up into three loops loop-1, loop-2, and loop-3 in the memory 22 which are separately extracted and recorded in the memory 23. To carry out the process of synthesizing these loops, the initially blank memory 24 is provided on which one of these loops, the loop-1 in FIG. 10, is extracted by means of the tracing from the specified point inside this loop-1. Here the tracing in one direction suffices as the figure is known beforehand as a closed one. Then the exclusive "or" operation of the figures on the memory 23 and the figures on the memory 24 is taken. As a result, since there was only the loop-1 on the memory 24, the figure identical to the loop-1 is left on the memory 24, as shown in FIG. 10 as 24-1. Next, the similar process is carried out for the loop-2 which yields the result shown in FIG. 10 as 24-2, in which the loop-1 and the loop-2 have been synthesized. By carrying out the similar process for the loop-3, the original closed figure can be reconstructed. The final result of this process is then stored in the memory 25 as before.

As explained, according to the present invention, the operator is required to specify only a point for each closed figure in the images in accordance with which the closed figures are extracted and symbolized, so that an efficiency as well as an accuracy of the figure encoding process can be improved significantly. Moreover, according to the above embodiment, a figure only partially closed by mistake and a figure subdivided into smaller fragments by mistake can be corrected into the closed figures as intended, also in accordance with a point for each closed figure specified by the operator, so that the elaborated error correction process indispensable in the prior art can now be dispensable. Furthermore, the figure encoder of the present invention is capable of handling complicated figures that cannot be dealt with by the prior art method utilizing pattern recognitions, so that this figure encoder possesses a much wider range of applicability.

It is to be noted that the tracing of the thinned image of the line segment utilized in this embodiment for extracting the figures can be replaced by the tracing of the boundaries of the figures and the background.

Besides this, many modifications and variations of this embodiment may be made without departing from the novel and advantageous features of the present invention. Accordingly, all such modifications and variations are intended to be included within the scope of the appended claims.

What is claimed is:

1. A figure encoder, comprising:
   image memory means for recording images;
   display means for displaying the images recorded in the image memory means;
   pointing means for specifying a point on the images displayed by the display means;
   extracting means for extracting an image of a figure which at least roughly encloses the specified point in accordance with a coordinate of the specific point;
   means for detecting coordinates of end points of line segments involved in the figure extracted by the extracting means when the figure encloses the specified point incompletely;
   means for interpolating between the detected end points on the images recorded in the image memory means to produce a closed figure which completely encloses the specified point; and
   means for encoding the image of the closed figure obtained by the interpolating means.

2. The figure encoder of claim 1, wherein the extracting means includes:
   means for thinning the images recorded in the image memory means; and
   means for tracing a contour of a thinned image of the figure which at least roughly enclosing the specified point.

3. The figure encoder of claim 1, wherein the extracting means includes means for tracing the boundaries of the figure which is at least roughly enclosing the specified point in the images recorded in the image memory means.

4. The figure encoder of claim 1, wherein the extracting means includes means for synthetically extracting a plurality of closed figures, each closed figure enclosing a point specified by the pointing means, as a single closed figure.

* * * * *